United States Patent [19]

Kossett

[11] Patent Number: 4,638,899

[45] Date of Patent: Jan. 27, 1987

[54] SIMPLIFIED METHOD OF SECURING THE CLUTCH SPRING TO THE TORQUE INPUT DRUM OF A SPRING CLUTCH, AND RESULTING MECHANISM

[75] Inventor: John A. Kossett, Columbia Heights, Minn.

[73] Assignee: Reell Precision Manufacturing Corp., Saint Paul, Minn.

[21] Appl. No.: 706,633

[22] Filed: Feb. 28, 1985

[51] Int. Cl.⁴ .............................................. F16D 13/08
[52] U.S. Cl. ................................ 192/81 C; 192/84 T; 29/525
[58] Field of Search ............... 192/8 C, 12 BA, 17 D, 192/41 S, 56 C, 81 C, 84 T; 267/179; 29/525, 227

[56] References Cited

U.S. PATENT DOCUMENTS

| 3,185,276 | 5/1965 | Sajovec | 192/84 T |
|---|---|---|---|
| 3,301,364 | 1/1967 | Bennett et al. | 192/56 C |
| 3,373,851 | 3/1968 | Baer et al. | |
| 3,442,359 | 5/1969 | Atchison | 192/41 S |
| 3,465,857 | 9/1969 | Baer | |
| 3,735,847 | 5/1973 | Bruckes | |
| 3,835,972 | 9/1974 | Helander | |
| 3,859,705 | 1/1975 | Dulude et al. | 267/179 X |
| 4,263,995 | 4/1981 | Wahlstedt | 192/84 T |

Primary Examiner—George H. Krizmanich

[57] ABSTRACT

In a spring clutch having a power input endpiece carrying an input hub, the input end of the helical clutch spring is permanently bound to the endpiece at the hub base by press fitting the coil into a circular groove at least partially surrounding said hub.

5 Claims, 4 Drawing Figures

SIMPLIFIED METHOD OF SECURING THE CLUTCH SPRING TO THE TORQUE INPUT DRUM OF A SPRING CLUTCH, AND RESULTING MECHANISM

BACKGROUND OF THE INVENTION

This invention relates to spring clutch mechanisms and to improved means for anchoring an end of the helical clutch spring. In one particular aspect the invention relates to the provision of an electromagnetically actuated spring clutch wherein the spring is permanently bound to the power input member.

Attachment between spring and power input or output member in spring clutch mechanisms has previously been accomplished by other methods. In one, a tab or tang extending either axially or radially from an end turn of the helical coil spring is inserted into a slot or cavity in the power transmitting member. In another, the several end turns of the spring are frictionally secured to the power transmitting drum, e.g. by reducing the diameter of the turns, or by increasing the number of contacting coils or the diameter of the drum. A further method involves the placing of a separate compressible split ring about the several end turns of the spring. These methods may be seen in the disclosures of U.S. Pat. Nos. 3,185,276; 3,373,851; 3,465,857; 3,735,847; 3,835,972; and 4,263,995.

The shaping of the spring wire to provide a partially constricted diameter or an additional tang involves added expense. An axial tang requires an axial cavity and limits desirable reduction in thickness of the member receiving the tang. A spring restrained by a tang is subject to "humping", a condition in which the adjacent coils do not return fully to their initial diameter and so cause an alteration of the "at rest" position of clutch-connected mechanism. The incorporation of a compressible split ring involves additional expense both in components and in assembly, and increases space requirements.

SUMMARY OF THE INVENTION

The present invention avoids these and other difficulties by bonding the entire end coil of the clutch spring to the base of the input drum, as will now be described and illustrated in connection with the appended drawing.

DETAILED DESCRIPTION

Figure 1:
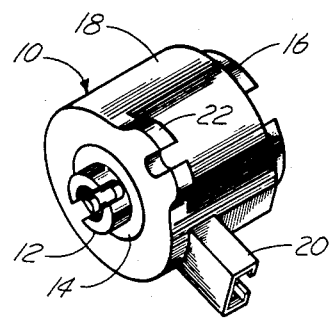
FIG. 1 is a view perspective of an electromagnetically actuated spring clutch using the principles of the invention.

The clutch assembly 10 will be seen in FIG. 1 to include a hollow shaft 12, a disk or collar 14, a slotted torque input endpiece 16, and a casing 18 carrying a connector 20 and fitted with a mounting flange 22. The end of the shaft 12 is slotted for coupling to an external torque-receiving mechanism.

Figure 2:
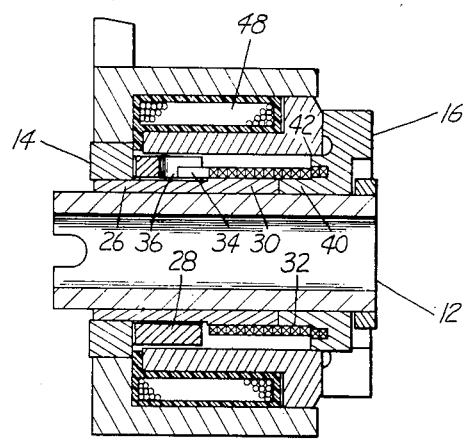
FIG. 2 is a view in longitudinal cross-section showing structural details of the clutch of FIG. 1, in engaged position.
Figure 3:
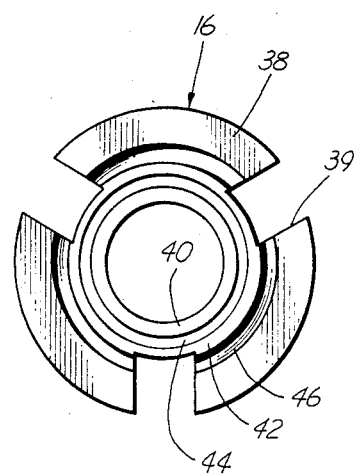
FIG. 3 is a plan view of the torque input endpiece of the clutch of FIGS. 1 and 2.
Figure 4:
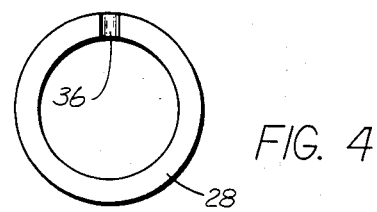
FIG. 4 is a plan view of the control disc.

FIGS. 2-4 show the interior construction of the clutch of FIG. 1. The shaft 12 is press fit within an elongate cylindrical bushing 26 which in turn is press fit into the disk 14 and also carries a rotatable control ring 28. The remaining length 30 of the bushing is of enlarged diameter. It retains the ring 28 and serves as drum or hub to support one end portion of helical clutch spring 32. The terminal coil of said end portion has an extended axial tab or tang 34 fitting within a radial slot 36 in the control ring 28. The parts are held together by a press fit retaining ring.

The endpiece 16 comprises an outer flat annulus 38 radially slotted as at slots 39 or otherwise modified for connection to a source of torque. A cylindrical drum or hub 40 extends inwardly from the annulus to a plane closely adjacent the inner end of the bushing 26 and is of the same external diameter as the bushing portion 30. A short tubular ring 42 also extends inwardly from the annulus, forming between itself and the base of the hub 40 a shallow circular groove or channel 44.

The spring 32 fits over the bushing section 30 and hub 40, with the tang 34 in the slot 36 and with the opposite end coil securely bound within the channel 44 by a press fit. Retention of the coil is aided by slight elastic deformation of the ring 42. An optional outer relief channel 46 assures proper fit. The entire end coil is thereby securely and permanently bound to the annulus 16.

The clutch herein described and illustrated is useful for example in the operation of paper feed mechanisms. The assembly is mounted on a shaft and the housing is restrained from rotating by means of the flange 22. The member 16 is connected to a prime mover with the shaft 12 connected to the paper feed apparatus. In the inactivated state the member 16 together with the spring 32 and ring 36 rotate freely about the shaft 12 and bushing 26. Upon application of EMF to coil 48 by way of the contacts in connector 20, the ring 28 is magnetically held against disk 14, the spring 32 wraps down against the hubs 30 and 40, and the shaft 12 is caused to rotate with endpiece 16.

Where reference is made in the foregoing description to "input" and "output" members, it will be appreciated that these functions may be reversed if desired. The term "bound to" as here used in connection with the fastening together of spring and endpiece is here intended to imply a connection at least as effective and break-resistant as is obtained in a press fit as described, and which may therefore be termed "permanent".

What is claimed is as follows:

1. A spring clutch mechanism having an endpiece supporting a first drum or hub and grooved to provide a circular groove at least partially surrounding the base of said drum, a second drum coaxially adjacent said first drum, and a helical clutch spring closely surrounding said drums with a terminal coil of said spring permanently bound within said groove against rotation and removal.

2. Mechanism of claim 1 wherein said terminal coil is bound within said groove in a press fit.

3. In an electromagnetic spring clutch comprising a shaft, an endpiece rotatable about said shaft and including an input drum, an output drum affixed to said shaft and axially adjacent said input drum, a helical clutch spring closely surrounding said drums, and electromagnetic actuating means for causing said spring to wrap down onto said drums for preventing rotary movement between said spring and said output drum, the improvement comprising having the terminal coil of said spring permanently bound within a circular groove at least partially surrounding the base of said input drum of said endpiece.

4. Mechanism of claim 3 wherein said end coil is bound within said groove in a press fit.

5. In the manufacture of a spring clutch mechanism having a clutch spring surrounding an output drum and a coaxially adjacent input drum extending from a supporting endpiece, the method of securing said spring about said input drum comprising forming a circular groove in said endpiece at the base of said input drum and at least partially surrounding said drum, and forcing the end coil of said spring into said groove in a press fit.

* * * * *